(12) United States Patent
Kitagawa et al.

(10) Patent No.: US 8,101,131 B2
(45) Date of Patent: Jan. 24, 2012

(54) CHLOROSILANES PURIFYING APPARATUS AND CHLOROSILANES MANUFACTURING METHOD

(75) Inventors: Teruhisa Kitagawa, Suzuka (JP); Mitsutoshi Narukawa, Yokkaichi (JP); Chikara Inaba, Yokkaichi (JP)

(73) Assignee: Mitsubishi Materials Corporation, Tokyo (JP)

( * ) Notice: Subject to any disclaimer, the term of this patent is extended or adjusted under 35 U.S.C. 154(b) by 314 days.

(21) Appl. No.: 12/382,659

(22) Filed: Mar. 20, 2009

(65) Prior Publication Data
US 2009/0238748 A1 Sep. 24, 2009

(30) Foreign Application Priority Data
Mar. 24, 2008 (JP) ................................. 2008-076367

(51) Int. Cl.
 *B01J 8/02* (2006.01)
 *C01B 33/107* (2006.01)
(52) U.S. Cl. ........ 422/198; 422/200; 422/202; 422/211; 422/217; 423/342
(58) Field of Classification Search .................. 422/198, 422/200, 202, 211, 217; 423/342
See application file for complete search history.

(56) References Cited

U.S. PATENT DOCUMENTS

| | | | |
|---|---|---|---|
| 2,698,347 A * | 12/1954 | Giraitis | ........................ 570/261 |
| 3,066,010 A | 11/1962 | Horning et al. | |
| 3,475,139 A | 10/1969 | Schwarz et al. | |
| 3,645,684 A * | 2/1972 | De Cuir | ........................ 423/336 |
| 3,878,291 A * | 4/1975 | Keller et al. | .................. 423/341 |
| 4,182,747 A | 1/1980 | Gravey et al. | |
| 2004/0223902 A1 | 11/2004 | Ohrem | |

FOREIGN PATENT DOCUMENTS

| GB | 1407020 A | 9/1975 |
|---|---|---|
| JP | 2006-1804 | 1/2006 |

OTHER PUBLICATIONS

European Search Report dated Jun. 18, 2009, issued on the corresponding European patent application No. 09155661.3.

* cited by examiner

*Primary Examiner* — Jennifer A Leung
(74) *Attorney, Agent, or Firm* — Edwards Wildman Palmer LLP

(57) ABSTRACT

Aluminum chloride from a gas containing chlorosilanes produced in a chlorination reactor is effectively removed. A container 1 is filled with sodium chloride and heated by a heating device 17, a gas containing chlorosilanes produced by a reaction between metallurgical grade silicon and hydrogen chloride passes through the sodium chloride layer 16 to generate a double salt of aluminum chloride contained in the gas and the sodium chloride, and the gas from which the double salt is separated is recovered from a gas recovery tube 26.

4 Claims, 5 Drawing Sheets

CHLOROSILANES PURIFYING APPARATUS AND CHLOROSILANES MANUFACTURING METHOD

BACKGROUND OF THE INVENTION

1. Field of the Invention

The present invention relates to a chlorosilanes purifying apparatus for removing aluminum chloride from a gas containing chlorosilanes such as trichlorosilane produced by a reaction between metallurgical grade silicon and hydrogen chloride and a chlorosilanes manufacturing method.

Priority is claimed on Japanese Patent Application No. 2008-076367, filed on 24 Mar, 2008, the content of which is incorporated herein by reference.

2. Description of the Related Art

Trichlorosilane used as a raw material for manufacturing polycrystalline silicon is manufactured by a reaction between metallurgical grade silicon powder and hydrogen chloride gas in a chlorination reactor, and a higher purity is obtained through a multi-step distillation. In the gas generated in the chlorination reactor, in addition to the produced trichlorosilane, silicon tetrachloride, hydrogen, and hydrogen chloride as unreacted gas are contained. In addition, fine powder of the metallurgical grade silicon used as the raw material and metallic chlorides generated by reactions of impurities (Fe, Al, Ti, Ni, and the like) in the metallurgical grade silicon are also contained.

Among the metallic chlorides, although aluminum chloride ($AlCl_3$) has a relatively low sublimation point (183° C./2.5 atm), aluminum chloride easily solidifies when the system after chlorination is in an atmosphere at the sublimation point or less, and the solidified aluminum chloride deposits in a tank, pipe, or the like in the following processes and becomes the cause of blockage or corrosion. Therefore, conventionally, for example, methods of periodically withdrawing a sediment from the bottom of a distillation column in a subsequent process of the chlorination reactor, using metallurgical grade silicon having an extremely low aluminum density as a raw material, or the like have been employed (see Japanese Unexamined Patent Application Publication No. 2006-1804).

SUMMARY OF THE INVENTION

However, in the method using the deposition of aluminum chloride in the bottom of the distillation column, operations of withdrawing the sediment need to be performed frequently. In addition, in the method of limiting the aluminum density of the metallurgical grade silicon, metallurgical grade silicon provided for use is limited, and this causes high costs.

The present invention is designed to solve the above-mentioned problems. An object of the present invention is to effectively remove aluminum chloride from a gas containing chlorosilanes produced in a chlorination reactor.

A chlorosilanes purifying apparatus of the present invention includes: a heating device for heating a layer of sodium chloride in a container filled with the sodium chloride; a gas supplying tube for supplying gas containing chlorosilanes produced by a reaction between metallurgical grade silicon and hydrogen chloride in the container; and a gas recovery tube for exhausting the gas that had been passed through the layer of the sodium chloride in the container.

Specifically, the container is filled with the sodium chloride and heated, and the gas containing chlorosilanes produced by the reaction between metallurgical grade silicon and hydrogen chloride passes through the layer of the sodium chloride so as to generate a double salt by a reaction between aluminum chloride in the gas and the sodium chloride. The gas from which the double salt is separated is recovered. The double salt generated by the aluminum chloride ($AlCl_3$) and the sodium chloride (NaCl) is aluminum sodium chloride ($NaAlCl_4$) and is in a molten state at a temperature of 155° C. or higher.

The purifying apparatus of the present invention further includes a net plate for partitioning the container into upper and lower sections in the container, wherein the gas supplying tube is connected to a position lower than the net plate, the gas recovery tube is connected to a position higher than the net plate, and the sodium chloride is filled on the net plate.

In the purifying apparatus, the gas passes through the sodium chloride filled on the net plate and spreads widely inside the layer of the sodium chloride, thereby effectively generating the double salt. The sodium chloride applies a pellet form of granulated salt or a molded form thereof and has such a size that the sodium chloride does not drop from the net plate.

In addition, the chlorosilanes purifying apparatus of the present invention further includes a filtering apparatus for removing dust in the gas containing chlorosilanes which is provided in the upstream side of the gas supplying tube, wherein the filtering apparatus has a filter using a polytetrafluoroethylene fabric or a membrane filter formed of a continuous, porous body of polytetrafluoroethylene.

The gas containing chlorosilanes produced by the reaction between the metallurgical grade silicon and the hydrogen chloride is included with powder of the metallurgical grade silicon as dust. When the gas mixed with the metallurgical grade silicon powder is transferred to the container, the dust may be attached to the sodium chloride filling the container and cover the surface thereof to make the sodium chloride to become clayey. Accordingly, the gas cannot easily flow and the sodium chloride does not react with the aluminum chloride any more. Therefore, the gas passes through the filter before transferring to the container, thereby removing the dust. In this case, the gas containing chlorosilanes also contains unreacted hydrogen chloride. Accordingly, when the filter is made of a metal material, there is a concern that pitting corrosion or a break may occur. Therefore, a filter using a polytetrafluoroethylene fabric or a membrane filter formed of a continuous, porous body of polytetrafluoroethylene is used to increase durability of the filter.

Additionally, in the chlorosilanes purifying apparatus of the present invention, wherein a jacket for covering at least the outer surface of the bottom portion of the container is formed, a heat medium is supplied to inside the jacket, a double salt exhausting tube for exhausting generated double salt is connected to the bottom portion of the container to penetrate the jacket, a cylindrical wall surrounding the double salt exhausting tube is formed at the penetration portion, and the jacket is formed over the outside of the cylindrical wall.

In the purifying apparatus, when the double salt generated in the container is exhausted from the double salt exhausting tube at the bottom of the container, the double salt at the bottom of the container is collected in the inlet of the double salt exhausting tube to be flown into the double salt exhausting tube. Accordingly, a jointing portion of the double salt exhausting tube and the furnace wall is easily damaged by abrasion or the like due to the double salt. In this case, the jacket is formed on the outer surface of the bottom portion of the container and the heat medium is circulated inside the jacket. Therefore, when a pinhole is formed on the furnace wall, the heat medium of the jacket penetrates into the container. For this reason, the jacket and the drain tube are spaced by the cylindrical wall surrounding the periphery of the double salt exhausting tube. Accordingly, even when a pinhole is formed on the furnace wall near the jointing portion of the double salt exhausting tube, the jacket is not influenced.

A method of manufacturing chlorosilanes of the present invention is a method of manufacturing chlorosilanes purified by using the chlorosilanes purifying apparatus according to any one of the above descriptions. The method includes: supplying the gas containing chlorosilanes to the container from the gas supplying tube, passing through the layer of sodium chloride filled in the container, and exhausting the gas that had been passed through the layer of the sodium chloride by the gas recovery tube.

According to the chlorosilanes purifying apparatus and the chlorosilanes manufacturing method of the present invention, the gas containing chlorosilanes passes through the layer of the sodium chloride to generate the double salt of the aluminum chloride in the gas and the sodium chloride. Therefore, the aluminum chloride is removed from the gas, and blockage or corrosion of pipes that may occur in the following processes such as distillation process can be suppressed. In addition, the gas passes through the filter before transferring to the container, so that the gas from which dust can be removed is supplied to the container. Therefore, the function of the sodium chloride is not deteriorated by the influence of the dust and the sodium chloride exhibits its function effectively.

DETAILED DESCRIPTION OF THE INVENTION

Hereinafter, exemplary embodiments of a chlorosilanes purifying apparatus and a chlorosilanes manufacturing method according to the present invention will be described with reference to accompanying drawings.

FIGS. 1 to 4 illustrate an embodiment of a purifying apparatus. The purifying apparatus includes a container 1, a filtering apparatus 2 for removing dust from a gas to be transferred to the container 1, a drier 3 for drying and retaining sodium chloride to be filled in the container 1, and a double salt processing system 4 for processing double salt generated in the container 1.

Figure 1:
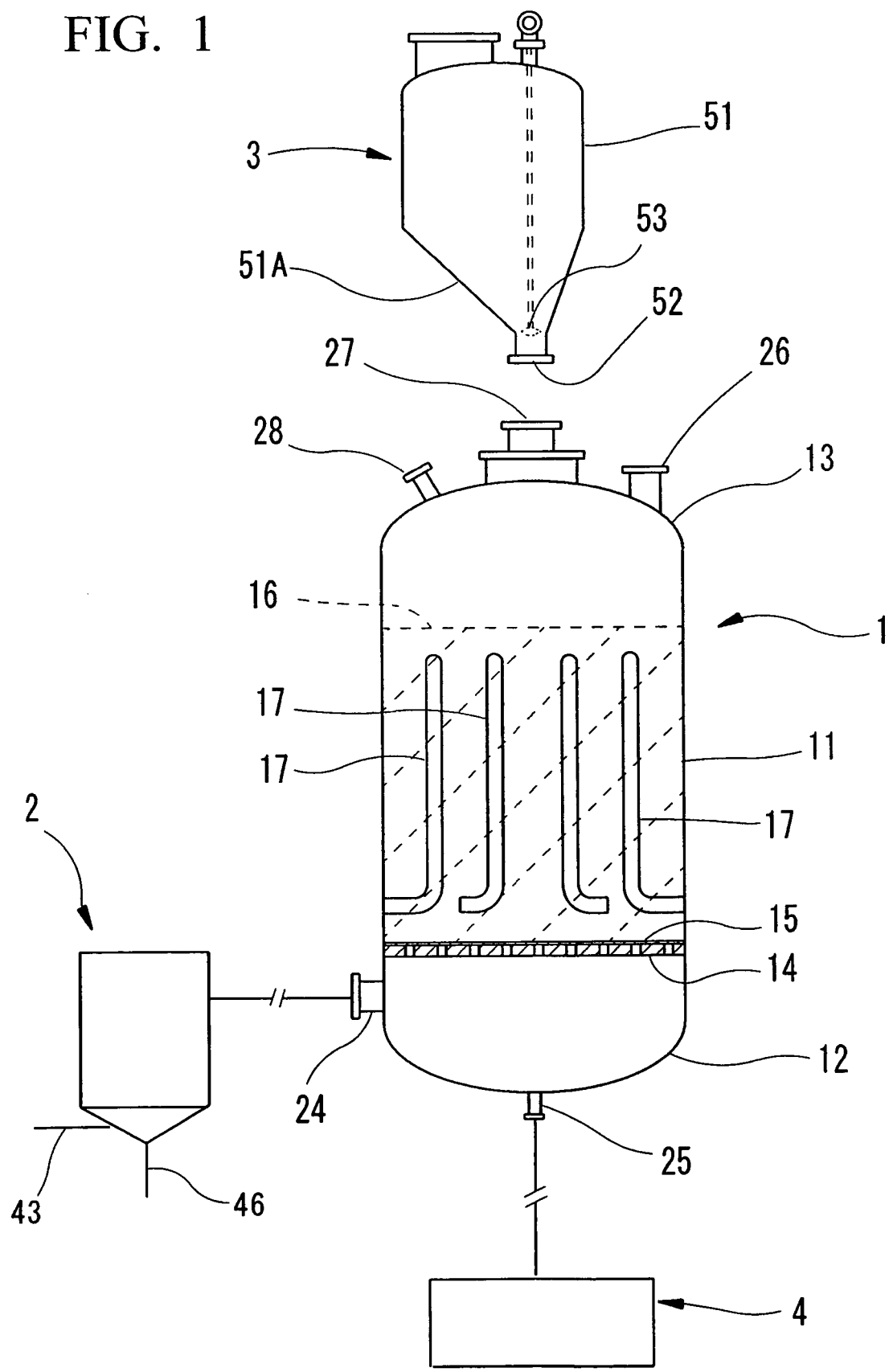
FIG. 1 is a schematic explanatory view partially illustrating a longitudinal section of a purifying apparatus according to an embodiment of the present invention.

The container 1 includes, as illustrated in FIG. 1, a body portion 11 having a vertical, cylindrical shape, a bottom portion 12 having a concave shape connected to a lower end of the body portion 11, and a top plate 13 having a dome shape connected to an upper end of the body portion 11.

At a lower portion of the body portion 11, a grid plate 14 is provided to divide the inside of the body portion 11 into upper and lower sections, a net plate 15 is provided on the grid plate 14, and sodium chloride is filled on the net plate 15. In this case, the grid plate 14 is formed of iron, and the net plate 15 is made of Hastelloy (registered trademark), which is a nickel-based corrosion-resistant alloy. Hastelloy is used for the net plate 15 because steel is eroded by the double salt described later and there is a possibility that stainless steel may be broken due to influence of chloride.

In addition, the sodium chloride applies a pellet form of granulated salt or a molded form thereof and has a shape of a solid of 32 mm×22 mm×12 mm to 46 mm×37 mm×20 mm. The form of granulated salt grains may be lump-shape. The size of the sodium chloride grains is not limited; however, it is preferably determined so that the longitudinal diameter of the sodium chloride is sufficiently smaller than the distance between adjoining heat exchanger tubes 17. Furthermore, the size of the sodium chloride is determined so that the sodium chloride does not drop from the net plate 15. The sodium chloride is filled in a hatched area by dashed lines in FIG. 1, and reference numeral 16 represents a layer of the sodium chloride.

Figure 2:
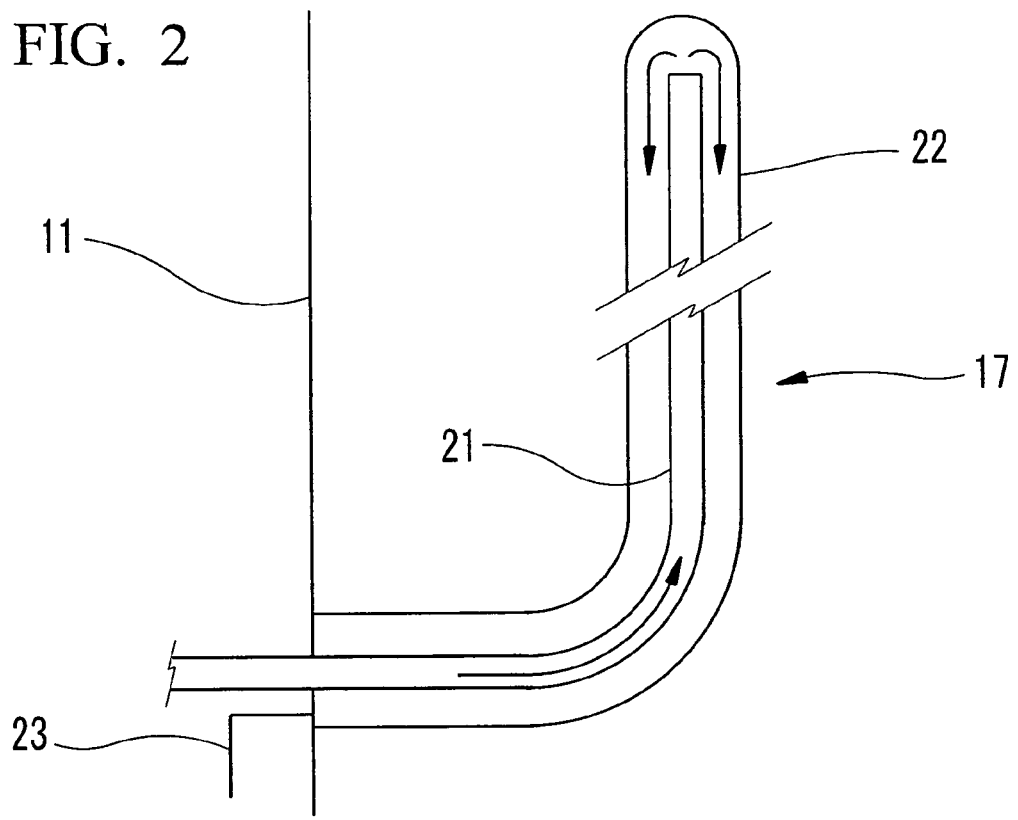
FIG. 2 is a longitudinal sectional view illustrating a heat exchanger tube of a container of the purifying apparatus according to the embodiment.

In addition, inside the body portion 11 above the net plate 15, as a heating device, a plurality of heat exchanger tubes 17 are provided at suitable gaps in a circumferential direction of the main body 11. Each of the heat exchanger tubes 17 is bent in an L-shape as a whole, the shape protrudes radially inward from the side wall of the main body 11 and extends upward in a longitudinal direction of the main body 11, and the heat exchanger tubes 17 are buried in the sodium chloride layer 16 as illustrated in FIG. 1. In addition, as illustrated in FIG. 2, each heat exchanger tube 17 has a double tube structure including an inner tube 21 and an outer tube 22, and the inner tube 21 has an open upper end to be communicated with the upper end of the outer tube 22. In addition, a heat medium such as steam introduced from the inner tube 21 flows over the opening of the upper end of the inner tube 21 to the inside of the outer tube 22, passes through a circular space between the outer tube 22 and the inner tube 21, and is exhausted from a drain tube 23 at the lower end of the outer tube 22. In addition, the gaps between each heat exchanger tube 17 and the side wall of the main body 11 and between the heat changer tubes 17 are wide enough to prevent the sodium chloride from partially clogging the gaps between heat exchanger tubes 17.

In addition, to the bottom portion 12 below the grid plate 14, a gas supplying tube 24 for supplying gas from the side and a double salt exhausting tube 25 for exhausting double salt downward from the deepest portion of the bottom portion 12 are connected as described later. To the top plate 13, a gas recovery tube 26, an inlet 27 of the sodium chloride, and a nozzle tube 28 provided with an inspection window are connected.

Figure 3:
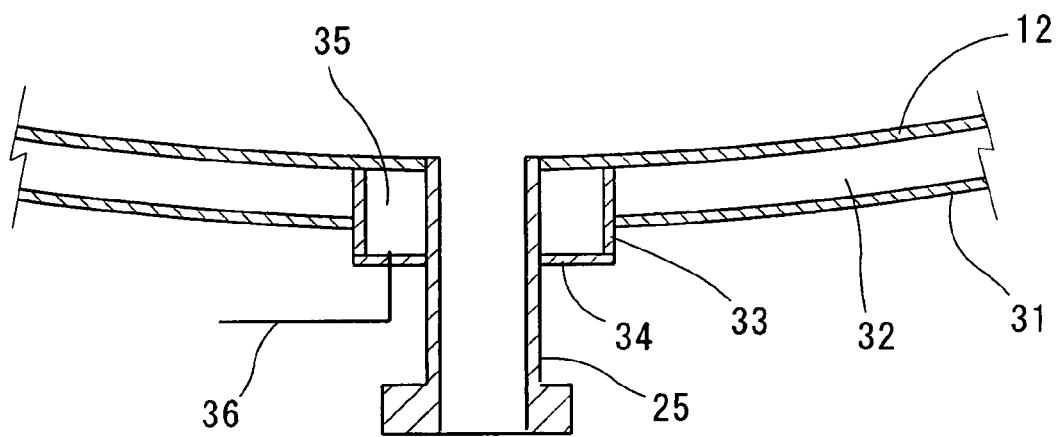
FIG. 3 is a longitudinal sectional view illustrating the adjacent of a jointing portion of a bottom portion of the container and a double salt exhausting tube of the purifying apparatus according to the embodiment.

In addition, as illustrated in FIG. 3, at the outer surface of the bottom portion 12 of the container 1, an outer wall 31 of the jacket is provided to cover the bottom portion 12 to be a double wall, and the heat medium is circulated through a space 32. The jacket has the outer wall, bottom portion 12, and the space therebetween. In addition, the double salt exhausting tube 25 extending downward from the bottom portion 12 penetrates the outer wall 31 while a cylindrical wall 33 is provided at the lower surface of the bottom portion 12 of the container 1 to surround the periphery of the double salt exhausting tube 25 and the outer wall 31 is provided outside the cylindrical wall 33, whereby the outer wall 31 and the double salt exhausting tube 25 are spaced by the cylindrical wall 33. Although a jointing portion of the double salt exhausting tube 25 and the bottom portion 12 is the most easily damaged by abrasion or the like due to the double salt when the double salt flows into the double salt exhausting tube 25 from the bottom portion 12 of the container 1, the jointing portion is designed so that the double salt does not reach the space 32 in the jacket 31 even when the pinhole is open.

In this case, a ring-shaped end plate 34 is provided to close the space between the cylindrical wall 33 and the double salt exhausting tube 25, a ring-shaped room 35 for surrounding the double salt exhausting tube 25 is formed by the cylindrical wall 33, the double salt exhausting tube 25, and the end plate 34 on the outer side of the bottom portion 12 of the container 1, and a drain tube 36 is connected to the bottom of the ring-shaped room 35. In addition, inside the adjacent of the jointing portion of the bottom portion 12 of the container 1 and the double salt exhausting tube 25, a liner made of a corrosion-resistant alloy such as Hastelloy (registered trademark) may be lined to cover the inner surface thereof.

Figure 4:
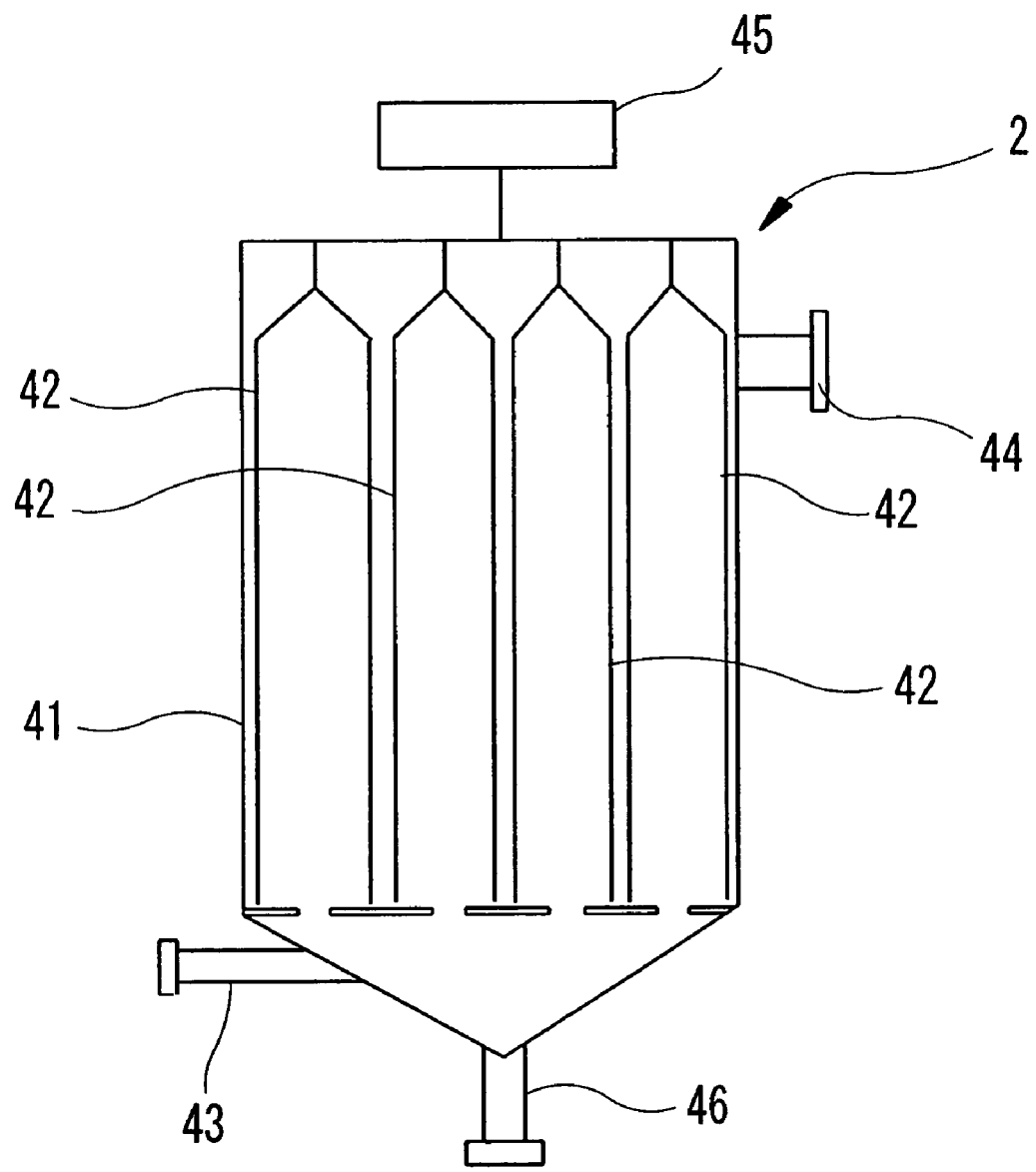
FIG. 4 is a schematic explanatory view illustrating a longitudinal section of a filtering apparatus used for the purifying apparatus according to the embodiment.

The filtering apparatus 2 is provided on the upstream side of the gas supplying tube 24. The filtering apparatus 2 has, for example, a bag filter as illustrated in FIG. 4 and has a construction in which a plurality of cylindrical filters 42 are hung inside a tank 41. Gas introduced from a gas introduction tube 43 at a lower portion of the tank 41 is directed to the inside of the cylindrical filters 42, passes through the filters 42, is exhausted from a gas exhausting tube 44 at an upper portion of the tank 41, and is transferred to the gas supplying tube 24 of the container 1. When the filter 42 used for the filtering apparatus 2 is made of a metal material, there is a concern that pitting corrosion or a break may occur. Therefore, a filter using a polytetrafluoroethylene fabric or a membrane filter formed of a fine continuous porous body of polytetrafluoroethylene may be used. In addition, above the tank 41, a vibration apparatus 45 for vibrating the filters 42 is provided to shake dust down from the filter 42. Reference numeral 46 denotes a dust exhausting tube for exhausting the falling dust.

The drier 3 is provided above the container 1 to store and dry a predetermined amount of sodium chloride in a tank 51. A lower portion of the inside of the tank 51 is formed as a hopper 51A, and a stopper 53 for opening and closing a lower opening 52 is provided. In addition, the lower opening 52 of the hopper 51A is disposed above the inlet 27 of the container 1.

In addition, although not shown in the figure, the double salt processing system 4 has a construction with a tank for temporarily storing the double salt received from the container 1 and a processing bath in which hydrolysis of the double salt extracted from the tank occurs.

In the purifying apparatus having the aforementioned construction, gas containing trichlorosilane produced by a reaction between metallurgical grade silicon and hydrogen chloride in a chlorination reactor in a previous process, is first introduced to the filtering apparatus 2 to make dust to be caught by the internal filters 42 and then transferred to the container 1. The dust contains powder of the metallurgical grade silicon. When the gas included with the metallurgical grade silicon powder is transferred to the container 1, the dust may cover the surface of the sodium chloride inside the container 1, and the sodium chloride becomes clayey. Accordingly, the gas cannot easily flow and the sodium chloride cannot function well. For this reason, dust such as the metallurgical grade silicon powder is removed by the filtering apparatus 2 before the gas is transferred to the container 1.

The gas supplied to the container 1 is transferred from the bottom portion 12 through the grid plate 14 and the net plate 15 to the sodium chloride layer 16. The sodium chloride layer 16 is heated in advance, for example, to 155 to 200° C., and preferably, to 160 to 200° C. by heat from the heat exchanger tubes 17 provided inside. While the gas passes through the sodium chloride layer 16, aluminum chloride ($AlCl_3$) in the gas and the sodium chloride (NaCl) generate aluminum sodium chloride ($NaAlCl_4$) as a double salt thereof, and the gas passing through the sodium chloride layer 16 from which the double salt is separated is exhausted from the gas recovery tube 26. In this case, since the sodium chloride is in a number of pellet forms, spaces are provided between the pellet forms in the sodium chloride layer 16. Accordingly, the gas spreads widely inside the sodium chloride layer 16 thereby effectively generating the double salt.

The generated double salt becomes a melt at a temperature of 155° C. or higher and therefore flows down to the bottom portion 12 of the container 1 through the net plate 15 and the grid plate 14 to be transferred from the double salt exhausting tube 25 to the double salt processing system 4, thereby enabling a hydrolysis treatment. In addition, the sodium chloride in the container 1 is consumed and gradually reduced. Therefore, supplying sodium chloride from the drier 3 is periodically performed.

The gas from which the aluminum chloride is removed as described above increases the purity of trichlorosilane thereafter and is transferred to be used in a distillation process. Since the powder of the metallurgical grade silicon or the aluminum chloride is removed in the aforementioned purifying process, the occurrence of blockage or corrosion of pipes can be suppressed.

Figure 5:
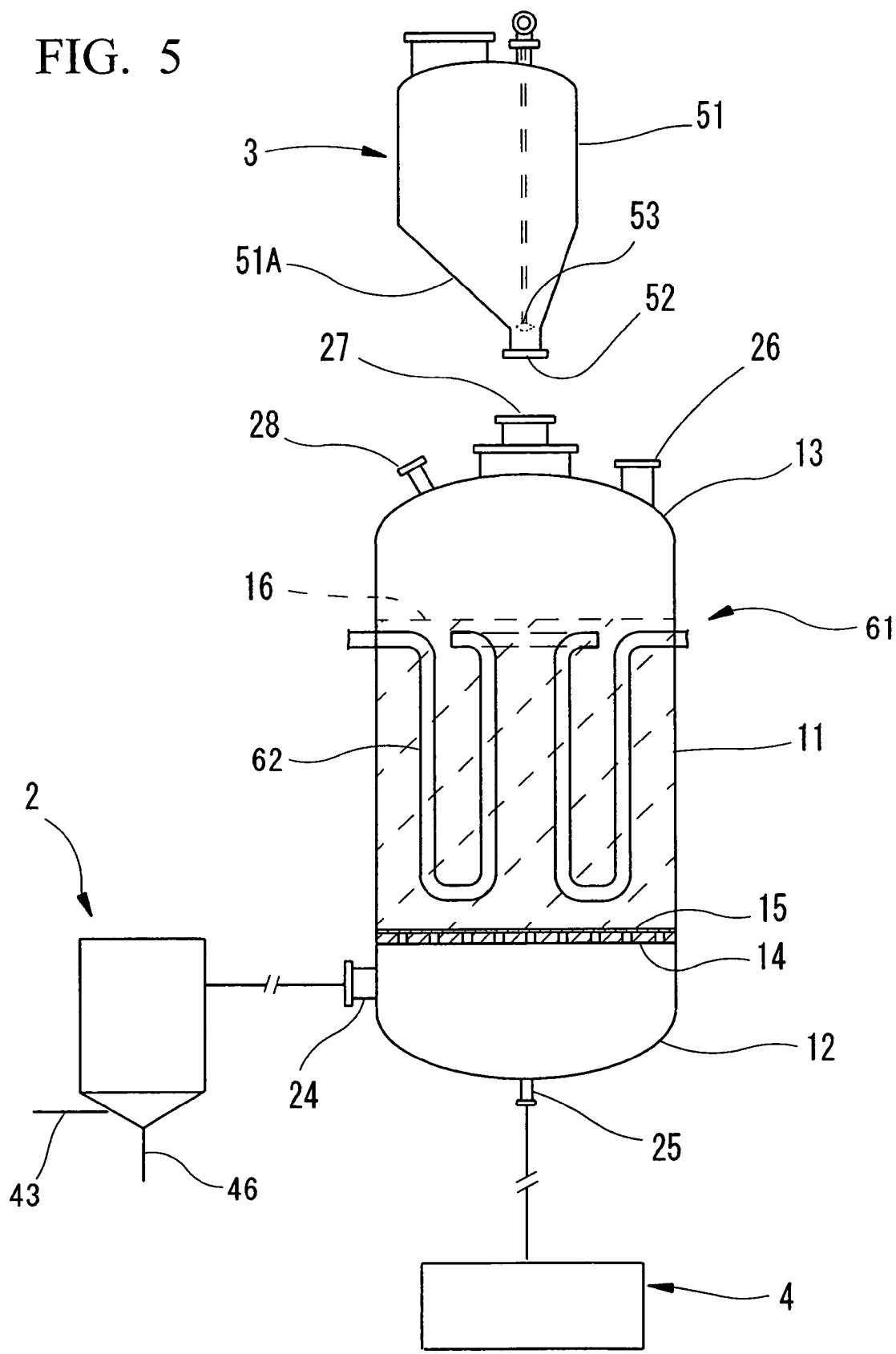
FIG. 5 is a schematic explanatory view partially illustrating a longitudinal section of a purifying apparatus according to another embodiment of the present invention.

FIG. 5 illustrates another embodiment of a purifying apparatus of the present invention. In this embodiment, heat exchanger tubes 62 disposed in a main body 11 of a container 61 filled with sodium chloride penetrate the side wall of the main body 11 and extend from an upper portion to a lower portion of the main body 11. In this case, the heat exchanger tubes 62 penetrate the side wall of the main body 11 plural times and are provided to be continuous in a circumferential direction of the main body 11. The portions disposed inside the container 61 extend in the longitudinal direction as illustrated in FIG. 5 and bend and turn at lower portions. To the heat exchanger tubes 62, oil is supplied as a heat medium. Other constructions are the same as in the above-mentioned embodiment, and the same elements are denoted by the same reference numbers of the above-mentioned embodiment, so that a detailed description thereof is omitted. Even in this case, gaps between the heat exchanger tubes 62 and the side wall of the main body 11 and between the heat exchanger tubes 62 are wide enough to prevent the sodium chloride from clogging the gaps when the sodium chloride is dropped from above to be filled in.

The present invention is not limited by the embodiments and may be modified in various forms without departing from the spirit and scope of the present invention. For example, as the heating device, the heat exchanger tubes are provided in the container. However, a configuration for heating the outside of the container using a band heater, tape heater, or the like may be used singly or in combination with the heat exchanger tubes. In addition, although the bag filter is used for the filtering apparatus, a filtering apparatus having another structure may also be used. In addition, although the ring-shaped room is formed on the outside of the bottom portion of the container by the cylindrical wall and the end plate, at least the cylindrical wall is necessary and the end plate may be omitted. In addition, the cylindrical wall may be formed as a double tube around the double salt exhausting tube.

EXAMPLES

Figure 6:
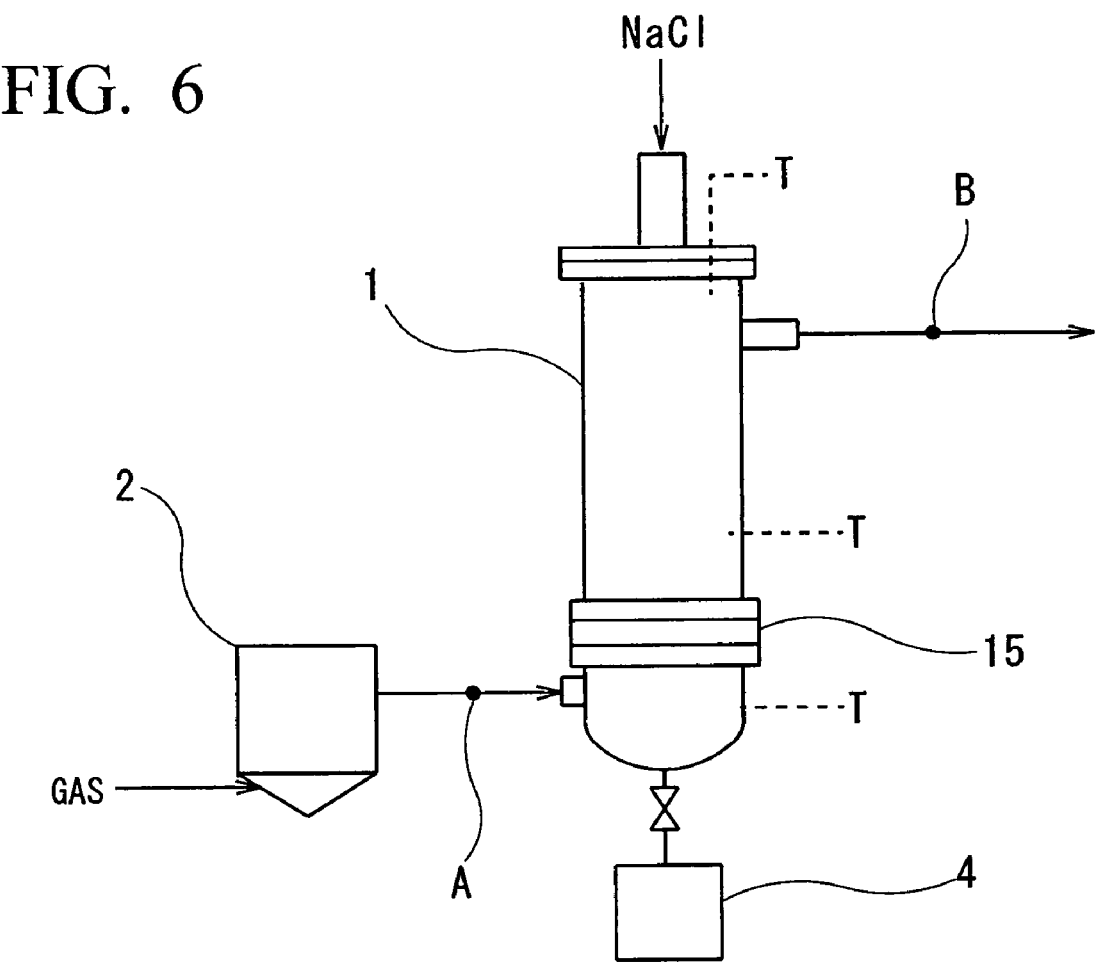
FIG. 6 is a schematic explanatory view illustrating an apparatus according to an example performed to verify effects of the present invention.

Chlorosilanes gas produced by a reaction between metallurgical grade silicon powder and hydrogen chloride gas in a chlorination reactor in a previous process was introduced to the bag filter (filtering apparatus) 2 as illustrated in FIG. 6, and metal powder dust was removed from the chlorosilanes gas. Thereafter, the chlorosilanes gas was supplied to the container 1 filled with sodium chloride to be subjected to a reaction at a temperature of 150 to 220° C. for several to tens of hours, and gas at "A" before the container inlet and at "B" after the container outlet were collected. The collected gases were condensed, the Al component in aluminum chloride was measured by an atomic emission spectrophotometer (ICP-AES), and checking of the weight ratio of the aluminum chloride included in the chlorosilanes was performed.

In addition, as the bag filter 2, a filter made of polytetrafluoroethylene was used. The container 1 having an inner diameter of 155.2 mm and a height of 1,300 mm was heated by covering the periphery of the main body with a tape heater. The measuring place of the temperature in the furnace is denoted by a symbol T in FIG. 6. As the net plate 15, wires having a diameter of 3 mm which were woven to form a grid structure at an interval of 4 mm were used. As the sodium chloride, a granulated salt of 40 mm×40 mm×18 mm which has a NaCl content of 98.53 wt % was used. The collected gases were condensed by using a dry ice-methanol liquid at −60° C. or less. The results are shown in Table 1. The removal rate in the table denotes a percentage representing (concentration before inlet—concentration after outlet)/concentration before inlet.

TABLE 1

| No. | Temperature in container (° C.) | Reaction time (hrs) | Concentration before inlet (wt %) | Concentration after outlet (wt %) | Height of NaCl layer (mm) | Removal rate (%) |
| --- | --- | --- | --- | --- | --- | --- |
| 1 | 162 | 8.4 | 0.320 | 0.015 | 760 | 95.3 |
| 2 | 183 | 5.0 | 0.150 | 0.004 | 700 | 97.3 |
| 3 | 188 | 4.8 | 0.255 | 0.011 | 700 | 95.7 |
| 4 | 195 | 6.3 | 0.180 | 0.013 | 700 | 92.8 |
| 5 | 200 | 7.8 | 0.210 | 0.023 | 700 | 89.0 |
| 6 | 168 | 79.9 | 0.134 | 0.018 | 900 | 86.6 |
| 7 | 168 | 91.5 | 0.123 | 0.012 | 900 | 90.2 |
| 8 | 210 | 44.2 | 0.096 | 0.023 | 900 | 76.0 |
| 9 | 220 | 44.0 | 0.094 | 0.018 | 900 | 80.9 |
| 10 | 220 | 66.8 | 0.090 | 0.019 | 900 | 78.9 |
| 11 | 155 | 7.5 | 0.236 | 0.079 | 760 | 66.5 |
| 12 | 150 | 46.5 | 0.112 | 0.101 | 900 | 9.8 |

As can be seen in Table 1, during the purification of the chlorosilanes gas for several hours, at a temperature of 155° C. or higher, the removal ratio of the aluminum chloride was 66.5 to 97.3%. In any measurement, blockage in the container during the reaction time band did not occur.

In addition, when the operation of the container filled with the sodium chloride is stopped and the temperature in the container decreases, solidification of the double salt in the container was observed. Therefore, in order to avoid blockage in the case where the temperature in the container decreases during practical operation, the re-melting point of the double salt was checked. As a result, a melting point of about 155 to 160° C. was observed. Therefore, the container may be heated to 155° C. or higher, and preferably to 160° C. or higher.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. A chlorosilanes purifying apparatus comprising:
a container filled with sodium chloride;
a heating device for heating a layer of sodium chloride in the container;
a gas supplying tube for supplying gas containing chlorosilanes produced by a reaction between metallurgical grade silicon and hydrogen chloride in the container; and
a gas recovery tube for exhausting the gas that had been passed through the layer of the sodium chloride in the container; wherein
a jacket for covering at least the outer surface of the bottom portion of the container is formed,
a heat medium is supplied to the jacket,
a double salt exhausting tube for exhausting generated double salt is connected to the bottom portion of the container to penetrate the jacket,
a cylindrical wall surrounding the double salt exhausting tube is formed at the penetration portion, and
the jacket is formed over the outside of the cylindrical wall.

2. The chlorosilanes purifying apparatus according to claim 1, further comprising a net plate for partitioning the container into upper and lower sections in the container, wherein the gas supplying tube is connected to a position lower than the net plate,
the gas recovery tube is connected to a position higher than the net plate, and
the sodium chloride is filled on the net plate.

3. The chlorosilanes purifying apparatus according to claim 1, further comprising a filter for removing dust in the gas containing chlorosilanes which is provided in the upstream side of the gas supplying tube, wherein the filter has a filter using a polytetrafluoroethylene fabric or a membrane filter formed of a continuous porous body of polytetrafluoroethylene.

4. A method of manufacturing chlorosilanes, comprising:
providing the chlorosilanes purifying apparatus according to claim 1,
supplying the gas containing chlorosilanes to the container from the gas supplying tube, passing through the layer of sodium chloride filled in the container, and
exhausting the gas that had been passed through the layer of the sodium chloride by the gas recovery tube.

* * * * *